US011114667B2

(12) United States Patent
Pras et al.

(10) Patent No.: US 11,114,667 B2
(45) Date of Patent: Sep. 7, 2021

(54) ELECTRODE-FORMING COMPOSITION

(71) Applicants: SOLVAY SA, Brussels (BE); CENTRE NATIONAL DE LA RECHERCHE SCIENTIFIQUE, Paris (FR); COMMISSARIAT A L' ENERGIE ATOMIQUE ET AUX ENERGIES ALTERNATIVES, Paris (FR)

(72) Inventors: Olivier Pras, Grenoble (FR); Hélène Rouault, Le Versoud (FR); Aurélie Guyomard-Lack, Saint Lambert la Potherie (FR); Jean Le Bideau, Nantes (FR); Dominique Guyomard, Sautron (FR); Bernard Lestriez, Nantes (FR); Christine Hamon, Bollate (IT); Marc-David Braida, Bry-sur-Marne (FR); Julio A. Abusleme, Saronno (IT)

(73) Assignees: Solvay SA, Brussels (BE); CENTRE NATIONAL DE LA RECHERCHE SCIENTIFIQUE, Paris (FR); Commissariat à l'Énergie Atomique et aux Énergies Alternatives, Paris (FR)

(*) Notice: Subject to any disclaimer, the term of this patent is extended or adjusted under 35 U.S.C. 154(b) by 630 days.

(21) Appl. No.: 15/748,170

(22) PCT Filed: Jul. 22, 2016

(86) PCT No.: PCT/EP2016/067565
§ 371 (c)(1),
(2) Date: Jan. 26, 2018

(87) PCT Pub. No.: WO2017/017023
PCT Pub. Date: Feb. 2, 2017

(65) Prior Publication Data
US 2018/0233751 A1 Aug. 16, 2018

(30) Foreign Application Priority Data
Jul. 27, 2015 (EP) .................................... 15306222

(51) Int. Cl.
*H01M 4/62* (2006.01)
*H01M 4/04* (2006.01)
*H01M 10/0525* (2010.01)
*H01M 10/0565* (2010.01)
*H01M 10/056* (2010.01)
*H01M 10/052* (2010.01)
*H01M 50/403* (2021.01)
*H01M 50/446* (2021.01)

(52) U.S. Cl.
CPC ......... *H01M 4/623* (2013.01); *H01M 4/0404* (2013.01); *H01M 4/0409* (2013.01); *H01M 4/62* (2013.01); *H01M 10/052* (2013.01); *H01M 10/056* (2013.01); *H01M 10/0525* (2013.01); *H01M 10/0565* (2013.01); *H01M 50/403* (2021.01); *H01M 50/446* (2021.01); *H01M 2300/0082* (2013.01)

(58) Field of Classification Search
CPC ......... H01M 10/0525; H01M 10/0565; H01M 2/14; H01M 2/16; H01M 4/04; H01M 4/0409; H01M 10/056; H01M 4/623; H01M 10/052; H01M 2/145; H01M 4/0404; H01M 2/166; H01M 2300/0082
See application file for complete search history.

(56) References Cited

U.S. PATENT DOCUMENTS

| 6,203,944 B1 | 3/2001 | Turner et al. | |
| 2001/0018144 A1* | 8/2001 | Watakabe | H01M 8/1007 429/482 |
| 2006/0032045 A1 | 2/2006 | Naarmann et al. | |
| 2010/0133482 A1* | 6/2010 | Abusleme | B01D 71/76 252/511 |
| 2013/0149585 A1 | 6/2013 | Wei et al. | |
| 2015/0140473 A1* | 5/2015 | Abusleme | H01M 10/0569 429/516 |

FOREIGN PATENT DOCUMENTS

| EP | 0793286 | * | 3/1997 |
| EP | 793286 A1 | | 9/1997 |

(Continued)

OTHER PUBLICATIONS

16741346,Decision_to_grant_a_European_patent, dated Jun. 5, 2020 (Year: 2020).*
Lewandowski A. et al., "Ionic liquids as electrolytes for Li-ion batteries—an overview of electrochemical studies", Journal of Power Sources, Dec. 1, 2009 (Dec. 1, 2009), vol. 194, No. 2, pp. 601-609.

*Primary Examiner* — Alexander Usyatinksy
(74) *Attorney, Agent, or Firm* — Osha Bergman Watanabe & Burton LLP

(57) ABSTRACT

The present invention pertains to an electrode-forming composition, to use of said electrode-forming composition in a process for the manufacture of an electrode, to said electrode and to an electrochemical device comprising said electrode. The electrode-forming composition comprises at least one partially fluorinated fluoropolymer comprising recurring units derived from at least one fluorinated monomer and at least one functional hydrogenated monomer comprising at least one carboxylic acid end group, at least one electroactive compound, at least one liquid medium comprising at least one organic carbonate or at least one ionic liquid, and at least one metal salt.

15 Claims, No Drawings

(56) References Cited

FOREIGN PATENT DOCUMENTS

| WO | 0003444 A1 | 1/2000 |
|---|---|---|
| WO | 2008129041 A1 | 10/2008 |
| WO | 2013072216 A1 | 5/2013 |
| WO | 2013160240 A1 | 10/2013 |
| WO | WO 2013/160240 * | 10/2013 |
| WO | 2015169835 A1 | 11/2015 |

\* cited by examiner

ELECTRODE-FORMING COMPOSITION

This application is a U.S. national stage entry under 35 U.S.C. § 371 of International Application No. PCT/EP2016/067565 filed Jul. 22, 2016, which claims priority to European application No. 15306222.9 filed on Jul. 27, 2015. The entire contents of these applications are explicitly incorporated herein by this reference.

TECHNICAL FIELD

The present invention pertains to an electrode-forming composition, to use of said electrode-forming composition in a process for the manufacture of an electrode, to said electrode and to an electrochemical device comprising said electrode.

BACKGROUND ART

Fluoropolymers are known in the art to be suitable as binders for the manufacture of electrodes for use in electrochemical devices such as secondary batteries.

Generally, techniques for manufacturing either positive or negative electrodes involve the use of organic solvents such as N-methyl-2-pyrrolidone for dissolving fluoropolymer binders and homogenizing them with an electro-active material and all other suitable components to produce a paste to be applied to a metal collector.

The role of the organic solvent is typically to dissolve the fluoropolymer in order to bind the electro-active material particles to each together and to the metal collector upon evaporation of the organic solvent.

The polymer binder should properly bind the electro-active material particles together and to the metal collector so that these particles can chemically withstand large volume expansion and contraction during charging and discharging cycles.

In particular, WO 2008/129041 (SOLVAY SPECIALTY POLYMERS ITALY S.P.A.) Oct. 30, 2008 discloses linear semi-crystalline vinylidene fluoride copolymers comprising from 0.05% to 10% by moles of recurring units derived from (meth)acrylic monomers and uses thereof as binder in electrodes for lithium-ion batteries.

A prerequisite for successful commercialization of secondary batteries, in particular lithium-ion secondary batteries, is to secure battery safety in all environments.

Electrolytes suitable for use in electrochemical devices such as secondary batteries typically include liquid electrolytes and solid electrolytes.

In order for the electrolytes to be suitable for use in secondary batteries, they should exhibit high ionic conductivity, high chemical and electrochemical stability toward the electrodes and high thermal stability over a wide range of temperatures.

Liquid electrolytes suitable for use in lithium-ion secondary batteries typically comprise lithium salts dissolved in organic solvents.

For instance, EP 0793286 A (AEA TECHNOLOGY PLC) Sep. 3, 1997 discloses composite electrodes comprising an electrolyte comprising a vinylidene fluoride polymer grafted with unsaturated monomers comprising one or more groups selected from carboxyl groups, sulphonic acid groups, ester groups and amide groups.

Also, US 2006/0032045 (GAIA AKKUMULATORENWERKE GMBH) Feb. 16, 2006 discloses electrodes for storage devices including a lithium intercalatable carbon in a mixture with one or more organic solvents, a supporting electrolyte, a polymer binder and a supporting electrolyte additive.

However, critical safety issues may arise from overheating when a liquid electrolyte is heated above its flash point. In particular, thermal runaway may occur at high temperatures through chemical reaction of oxygen released by the cathode material with the organic liquid electrolyte as fuel.

In order to solve safety issues in lithium-ion secondary batteries, gel polymer electrolytes have been studied which advantageously combine the advantages of both liquid electrolytes and solid polymer electrolytes thus being endowed with high ionic conductivity and high thermal stability.

There is thus still a need in the art for electrodes suitable for use in electrochemical devices free from liquid electrolytes which still exhibit outstanding capacity values.

SUMMARY OF INVENTION

It has been now surprisingly found that by using the fluoropolymer composition of the invention it is possible to manufacture electrodes suitable for use in electrochemical devices, in particular electrochemical devices free from liquid electrolytes.

The electrode of the invention is easily obtainable by applying one or more layers of the fluoropolymer composition of the invention directly onto a metal collector, without using any other intermediate primer layer.

Also, the electrode of the invention is advantageously endowed with high ionic conductivity and successfully exhibits high adhesion to the metal collector and high cohesion within the electro-active material.

The electrode of the invention is thus particularly suitable for use in electrochemical devices, preferably secondary batteries, said electrochemical devices being advantageously free from liquid electrolytes while still exhibiting outstanding capacity values.

Further, it has been found that the electrode of the invention advantageously enables manufacturing electrochemical devices, preferably secondary batteries, said electrochemical devices being advantageously free from liquid electrolytes, while avoiding post-injection of an electrolyte medium into the electrochemical devices thereby provided.

In a first instance, the present invention pertains to an electrode-forming composition [composition (C1)] comprising:
- at least one partially fluorinated fluoropolymer comprising recurring units derived from at least one functional hydrogenated monomer comprising at least one carboxylic acid end group [polymer (FF)],
- at least one electro-active compound [compound (EA)],
- at least one liquid medium [medium (L)], and
- at least one metal salt [salt (M)].

The composition (C1) of the invention typically further comprises at least one organic solvent [solvent (S)] different from the medium (L).

The composition (C1) of the invention advantageously further comprises at least one conductive compound [compound (C)].

The composition (C1) preferably comprises, more preferably consists of:
- at least one partially fluorinated fluoropolymer comprising recurring units derived from at least one functional hydrogenated monomer comprising at least one carboxylic acid end group [polymer (FF)],
- at least one electro-active compound [compound (EA)],
- at least one liquid medium [medium (L)], at least one metal salt [salt (M)],
at least one organic solvent [solvent (S)] different from said medium (L), and
optionally, at least one conductive compound [compound (C)].

In a second instance, the present invention pertains to the use of the electrode-forming composition [composition (C1)] of the invention in a process for the manufacture of an electrode [electrode (E)].

The electrode (E) of the invention is particularly suitable for use in electrochemical devices.

Non-limiting examples of suitable electrochemical devices include secondary batteries.

For the purpose of the present invention, the term "secondary battery" is intended to denote a rechargeable battery.

The secondary battery of the invention is preferably an alkaline or an alkaline-earth secondary battery.

The secondary battery of the invention is more preferably a lithium-ion secondary battery.

The present invention thus also pertains to a process for the manufacture of an electrode [electrode (E)], said process comprising:
(i) providing a metal substrate;
(ii) providing an electrode-forming composition [composition (C1)] as defined above;
(iii) applying the composition (C1) provided in step (ii) onto the metal substrate provided in step (i) thereby providing an assembly comprising a metal substrate coated with at least one layer consisting of said composition (C1); and
(iv) drying the assembly provided in step (iii).

Under step (iii) of the process of the invention, the composition (C1) is applied onto the metal substrate typically by any suitable procedures such as casting, printing and roll coating.

Optionally, step (iii) may be repeated, typically one or more times, by applying the composition (C1) provided in step (ii) onto the electrode provided in step (iv).

The metal substrate typically acts as a metal collector.

The metal substrate is generally a foil, mesh or net made from a metal such as copper, aluminum, iron, stainless steel, nickel, titanium or silver.

In a third instance, the present invention pertains to the electrode [electrode (E)] obtainable by the process of the invention.

The electrode (E) of the invention typically comprises:
a metal substrate, and
directly adhered onto said metal substrate, at least one layer [layer (L1)] consisting of a composition [composition (C2)] comprising:
at least one partially fluorinated fluoropolymer comprising recurring units derived from at least one functional hydrogenated monomer comprising at least one carboxylic acid end group [polymer (FF)],
at least one electro-active compound [compound (EA)],
at least one liquid medium [medium (L)], and
at least one metal salt [salt (M)].

The composition (C2) advantageously further comprises at least one conductive compound [compound (C)].

The composition (C2) is advantageously free from one or more solvents (S).

The composition (C2) preferably comprises, more preferably consists of:
at least one partially fluorinated fluoropolymer comprising recurring units derived from at least one functional hydrogenated monomer comprising at least one carboxylic acid end group [polymer (FF)],
at least one electro-active compound [compound (EA)],
at least one liquid medium [medium (L)],
at least one metal salt [salt (M)], and
optionally, at least one conductive compound [compound (C)].

For the purpose of the present invention, the term "electro-active compound [compound (EA)]" is intended to denote a compound which is able to incorporate or insert into its structure and substantially release therefrom alkaline or alkaline-earth metal ions during the charging phase and the discharging phase of an electrochemical device. The compound (EA) is preferably able to incorporate or insert and release lithium ions.

The nature of the compound (EA) of the layer (L1) of the electrode (E) of the invention depends on whether the electrode (E) thereby provided is a positive electrode [electrode (Ep)] or a negative electrode [electrode (En)].

In the case of forming a positive electrode for a lithium-ion secondary battery, the compound (EA) may comprise a composite metal chalcogenide of formula $LiMQ_2$, wherein M is at least one metal selected from transition metals such as Co, Ni, Fe, Mn, Cr and V and Q is a chalcogen such as O or S. Among these, it is preferred to use a lithium-based composite metal oxide of formula $LiMO_2$, wherein M is the same as defined above. Preferred examples thereof may include $LiCoO_2$, $LiNiO_2$, $LiNi_xCo_{1-x}O_2$ (0<x<1) and spinel-structured $LiMn_2O_4$.

As an alternative, still in the case of forming a positive electrode for a lithium-ion secondary battery, the compound (EA) may comprise a lithiated or partially lithiated transition metal oxyanion-based electro-active material of formula $M_1M_2(JO_4)_fE_{1-f}$, wherein $M_1$ is lithium, which may be partially substituted by another alkali metal representing less that 20% of the $M_1$ metals, $M_2$ is a transition metal at the oxidation level of +2 selected from Fe, Mn, Ni or mixtures thereof, which may be partially substituted by one or more additional metals at oxidation levels between +1 and +5 and representing less than 35% of the $M_2$ metals, including 0, $JO_4$ is any oxyanion wherein J is either P, S, V, Si, Nb, Mo or a combination thereof, E is a fluoride, hydroxide or chloride anion, f is the molar fraction of the $JO_4$ oxyanion, generally comprised between 0.75 and 1.

The $M_1M_2(JO_4)_fE_{1-f}$ electro-active material as defined above is preferably phosphate-based and may have an ordered or modified olivine structure.

More preferably, the compound (EA) has formula $Li_{3-x}M'_yM''_{2-y}(JO_4)_3$ wherein $0 \leq x \leq 3$, $0 \leq y \leq 2$, M' and M'' are the same or different metals, at least one of which being a transition metal, $JO_4$ is preferably $PO_4$ which may be partially substituted with another oxyanion, wherein J is either S, V, Si, Nb, Mo or a combination thereof. Still more preferably, the compound (EA) is a phosphate-based electro-active material of formula $Li(Fe_xMn_{1-x})PO_4$ wherein $0 \leq x \leq 1$, wherein x is preferably 1 (that is to say, lithium iron phosphate of formula $LiFePO_4$).

In the case of forming a negative electrode for a lithium-ion secondary battery, the compound (EA) may preferably comprise:
graphitic carbons able to intercalate lithium, typically existing in forms such as powders, flakes, fibers or spheres (for example, mesocarbon microbeads) hosting lithium;
lithium metal;
lithium alloy compositions, including notably those described in U.S. Pat. No. 6,203,944 (3M INNOVATIVE PROPERTIES CO.) Mar. 20, 2001 and/or in WO 00/03444 (MINNESOTA MINING AND MANUFACTURING CO.) Jan. 20, 2000;

lithium titanates, generally represented by formula $Li_4Ti_5O_{12}$; these compounds are generally considered as "zero-strain" insertion materials, having low level of physical expansion upon taking up the mobile ions, i.e. $Li^+$;

lithium-silicon alloys, generally known as lithium silicides with high Li/Si ratios, in particular lithium silicides of formula $Li_{4.4}Si$;

lithium-germanium alloys, including crystalline phases of formula $Li_{4.4}Ge$.

For the purpose of the present invention, the term "partially fluorinated fluoropolymer" is intended to denote a polymer comprising recurring units derived from at least one fluorinated monomer and, optionally, at least one hydrogenated monomer, wherein at least one of said fluorinated monomer and said hydrogenated monomer comprises at least one hydrogen atom.

By the term "fluorinated monomer" it is hereby intended to denote an ethylenically unsaturated monomer comprising at least one fluorine atom.

By the term "hydrogenated monomer" it is hereby intended to denote an ethylenically unsaturated monomer comprising at least one hydrogen atom and free from fluorine atoms.

The term "at least one fluorinated monomer" is understood to mean that the polymer (FF) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one hydrogenated monomer" is understood to mean that the polymer (FF) may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

The polymer (FF) typically comprises recurring units derived from at least one fluorinated monomer, at least one functional hydrogenated monomer comprising at least one carboxylic acid end group and, optionally, at least one hydrogenated monomer different from said functional hydrogenated monomer comprising at least one carboxylic acid end group.

The polymer (FF) is typically obtainable by polymerization of at least one fluorinated monomer, at least one functional hydrogenated monomer comprising at least one carboxylic acid end group and, optionally, at least one hydrogenated monomer different from said functional hydrogenated monomer comprising at least one carboxylic acid end group.

Should the fluorinated monomer comprise at least one hydrogen atom, it is designated as hydrogen-containing fluorinated monomer.

Should the fluorinated monomer be free of hydrogen atoms, it is designated as per(halo)fluorinated monomer.

The fluorinated monomer may further comprise one or more other halogen atoms (Cl, Br, I).

Non-limiting examples of suitable fluorinated monomers include, notably, the followings:

$C_2$-$C_8$ perfluoroolefins such as tetrafluoroethylene and hexafluoropropylene;

$C_2$-$C_8$ hydrogenated fluoroolefins such as vinylidene fluoride, vinyl fluoride, 1,2-difluoroethylene and trifluoroethylene;

perfluoroalkylethylenes of formula $CH_2=CH-R_{f0}$ wherein $R_{f0}$ is a $C_1$-$C_6$ perfluoroalkyl;

chloro- and/or bromo- and/or iodo-$C_2$-$C_6$ fluoroolefins such as chlorotrifluoroethylene;

(per)fluoroalkylvinylethers of formula $CF_2=CFOR_{f1}$ wherein $R_{f1}$ is a $C_1$-$C_6$ fluoro- or perfluoroalkyl, e.g. $CF_3$, $C_2F_5$, $C_3F_7$;

$CF_2=CFOX_0$ (per)fluoro-oxyalkylvinylethers wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group;

(per)fluoroalkylvinylethers of formula $CF_2=CFOCF_2OR_{f2}$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups such as $-C_2F_5-O-CF_3$;

functional (per)fluoro-oxyalkylvinylethers of formula $CF_2=CFOY_0$ wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form;

fluorodioxoles, preferably perfluorodioxoles.

Should the fluorinated monomer be a hydrogen-containing fluorinated monomer such as, for instance, vinylidene fluoride, trifluoroethylene or vinyl fluoride, the polymer (FF) is either a partially fluorinated fluoropolymer comprising recurring units derived from at least one hydrogen-containing fluorinated monomer, at least one functional hydrogenated monomer comprising at least one carboxylic acid end group and, optionally, at least one fluorinated monomer different from said hydrogen-containing fluorinated monomer or it is a partially fluorinated fluoropolymer comprising recurring units derived from at least one hydrogen-containing fluorinated monomer, at least one functional hydrogenated monomer comprising at least one carboxylic acid end group, optionally, at least one fluorinated monomer different from said hydrogen-containing fluorinated monomer and, optionally, at least one hydrogenated monomer different from said functional hydrogenated monomer comprising at least one carboxylic acid end group.

Should the fluorinated monomer be a per(halo)fluorinated monomer such as, for instance, tetrafluoroethylene, chlorotrifluoroethylene, hexafluoropropylene or a perfluoroalkylvinylether, the polymer (FF) is a partially fluorinated fluoropolymer comprising recurring units derived from at least one per(halo)fluorinated monomer, at least one functional hydrogenated monomer comprising at least one carboxylic acid end group, at least one hydrogenated monomer different from said functional hydrogenated monomer comprising at least one carboxylic acid end group and, optionally, at least one fluorinated monomer different from said per(halo)fluorinated monomer.

The polymer (FF) may be amorphous or semi-crystalline.

The term "amorphous" is hereby intended to denote a polymer (FF) having a heat of fusion of less than 5 J/g, preferably of less than 3 J/g, more preferably of less than 2 J/g, as measured according to ASTM D-3418-08.

The term "semi-crystalline" is hereby intended to denote a polymer (FF) having a heat of fusion of from 10 to 90 J/g, preferably of from 30 to 60 J/g, more preferably of from 35 to 55 J/g, as measured according to ASTM D3418-08.

The polymer (FF) is preferably semi-crystalline.

The polymer (FF) comprises preferably at least 0.01% by moles, more preferably at least 0.05% by moles, even more preferably at least 0.1% by moles of recurring units derived from at least one functional hydrogenated monomer comprising at least one carboxylic acid end group.

The polymer (FF) comprises preferably at most 20% by moles, more preferably at most 15% by moles, even more preferably at most 10% by moles, most preferably at most 3% by moles of recurring units derived from at least one functional hydrogenated monomer comprising at least one carboxylic acid end group.

Determination of average mole percentage of recurring units derived from at least one functional hydrogenated monomer comprising at least one carboxylic acid end group in the polymer (FF) can be performed by any suitable method. Mention can be notably made of acid-base titration methods or NMR methods.

The polymer (FF) is preferably a partially fluorinated fluoropolymer comprising recurring units derived from vinylidene fluoride (VDF), at least one functional hydrogenated monomer comprising at least one carboxylic acid end group and, optionally, at least one fluorinated monomer different from VDF [polymer (FF-1)].

The polymer (FF-1) preferably comprises recurring units derived from:
- at least 60% by moles, preferably at least 75% by moles, more preferably at least 85% by moles of vinylidene fluoride (VDF),
- from 0.01% to 20% by moles, preferably from 0.05% to 15% by moles, more preferably from 0.1% to 10% by moles of at least one functional hydrogenated monomer comprising at least one carboxylic acid end group, and
- optionally, from 0.1% to 15% by moles, preferably from 0.1% to 12% by moles, more preferably from 0.1% to 10% by moles of at least one fluorinated monomer selected from vinyl fluoride ($VF_1$), chlorotrifluoroethylene (CTFE), hexafluoropropylene (HFP), tetrafluoroethylene (TFE), trifluoroethylene (TrFE) and perfluoromethylvinylether (PMVE).

The functional hydrogenated monomer comprising at least one carboxylic acid end group is preferably selected from the group consisting of (meth)acrylic monomers of formula (I):

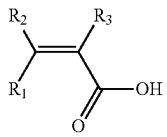

wherein each of $R_1$, $R_2$ and $R_3$, equal to or different from each other, is independently a hydrogen atom or a $C_1$-$C_3$ hydrocarbon group.

Non-limiting examples of functional hydrogenated monomers comprising at least one carboxylic acid end group include, notably, acrylic acid and methacrylic acid.

The polymer (FF) is advantageously a linear polymer [polymer ($FF_L$)] comprising linear sequences of recurring units derived from at least one fluorinated monomer, at least one functional hydrogenated monomer comprising at least one carboxylic acid end group and, optionally, at least one hydrogenated monomer different from said functional hydrogenated monomer comprising at least one carboxylic acid end group.

The polymer (FF) is thus typically distinguishable from graft polymers.

The polymer (FF) is advantageously a random polymer [polymer ($FF_R$)] comprising linear sequences of randomly distributed recurring units derived from at least one fluorinated monomer, at least one functional hydrogenated monomer comprising at least one carboxylic acid end group and, optionally, at least one hydrogenated monomer different from said functional hydrogenated monomer comprising at least one carboxylic acid end group.

The expression "randomly distributed recurring units" is intended to denote the percent ratio between the average number of sequences of at least one functional hydrogenated monomers (%), said sequences being comprised between two recurring units derived from at least one fluorinated monomer, and the total average number of recurring units derived from at least one functional hydrogenated monomer (%).

When each of the recurring units derived from at least one functional hydrogenated monomer is isolated, that is to say that a recurring unit derived from a functional hydrogenated monomer is comprised between two recurring units of at least one fluorinated monomer, the average number of sequences of at least one functional hydrogenated monomer equals the average total number of recurring units derived from at least one functional hydrogenated monomer, so that the fraction of randomly distributed recurring units derived from at least one functional hydrogenated monomer is 100%: this value corresponds to a perfectly random distribution of recurring units derived from at least one functional hydrogenated monomer. Thus, the larger is the number of isolated recurring units derived from at least one functional hydrogenated monomer with respect to the total number of recurring units derived from at least one functional hydrogenated monomer, the higher will be the percentage value of fraction of randomly distributed recurring units derived from at least one functional hydrogenated monomer.

The polymer (FF) is thus typically distinguishable from block polymers.

The polymer (FF) is typically obtainable by emulsion polymerization or suspension polymerization.

The choice of the solvent (S) is not particularly limited provided that it is suitable for solubilising the polymer (FF).

The solvent (S) is typically selected from the group consisting of:
- alcohols such as methyl alcohol, ethyl alcohol and diacetone alcohol,
- ketones such as acetone, methylethylketone, methylisobutyl ketone, diisobutylketone, cyclohexanone and isophorone,
- linear or cyclic esters such as isopropyl acetate, n-butyl acetate, methyl acetoacetate, dimethyl phthalate and γ-butyrolactone,
- linear or cyclic amides such as N,N-diethylacetamide, N,N-dimethylacetamide, dimethylformamide and N-methyl-2-pyrrolidone, and
- dimethyl sulfoxide.

For the purpose of the present invention, the term "liquid medium [medium (L)]" is intended to denote a medium comprising one or more substances in the liquid state at 20° C. under atmospheric pressure.

The medium (L) is typically free from one or more solvents (S).

The choice of the medium (L) is not particularly limited provided that it is suitable for solubilising the salt (M).

The salt (M) is typically selected from the group consisting of: (a) MeI, $Me(PF_6)_n$, $Me(BF_4)_n$, $Me(ClO_4)_n$, Me(bis(oxalato)borate)$_n$ ("$Me(BOB)_n$"), $MeCF_3SO_3$, $Me[N(CF_3SO_2)_2]_n$, $Me[N(C_2F_5SO_2)_2]_n$, $Me[N(CF_3SO_2)(R_FSO_2)]_n$, wherein $R_F$ is $C_2F_5$, $C_4F_9$ or $CF_3OCF_2CF_2$, $Me(AsF_6)_n$, $Me[C(CF_3SO_2)_3]_n$, $Me_2S_n$, wherein Me is a metal, preferably a transition metal, an alkaline metal or an alkaline-earth metal, more preferably Me being Li, Na, K or Cs, even more preferably Me being Li, and n is the valence of said metal, typically n being 1 or 2, (b)

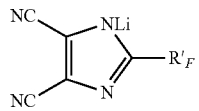

wherein $R'_F$ is selected from the group consisting of F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_3F_5OCF_3$, $C_2F_4OCF_3$, $C_2H_2F_2OCF_3$ and $CF_2OCF_3$, and (c) combinations thereof.

The amount of the medium (L) in the composition (C1) is typically at least 40% by weight, preferably at least 50% by weight, more preferably at least 60% by weight, based on the total weight of said medium (L) and the polymer (FF).

Very good results have been obtained using a composition (C1) comprising at least 50% by weight of the medium (L), based on the total weight of said medium (L) and the polymer (FF).

The concentration of the salt (M) in the medium (L) is advantageously at least 0.01 M, preferably at least 0.025 M, more preferably at least 0.05 M.

The concentration of the salt (M) in the medium (L) is advantageously at most 3 M, preferably at most 2 M, more preferably at most 1 M.

According to a first embodiment of the invention, the medium (L) comprises at least one organic carbonate.

Non-limiting examples of suitable organic carbonates include, notably, ethylene carbonate, propylene carbonate, mixtures of ethylene carbonate and propylene carbonate, dimethyl carbonate, diethyl carbonate, ethyl-methyl carbonate, butylene carbonate, vinylene carbonate, fluoroethylene carbonate, fluoropropylene carbonate and mixtures thereof.

According to a second embodiment of the invention, the medium (L) comprises at least one ionic liquid and, optionally, at least one organic carbonate.

For the purpose of the present invention, the term "ionic liquid" is intended to denote a compound formed by the combination of a positively charged cation and a negatively charged anion in the liquid state at temperatures below 100° C. under atmospheric pressure.

The ionic liquid typically contains:
a positively charged cation selected from the group consisting of imidazolium, pyridinium, pyrrolidinium and piperidinium ions optionally containing one or more $C_1$-$C_{30}$ alkyl groups, and
a negatively charged anion selected from the group consisting of halides, perfluorinated anions and borates.

Non-limiting examples of $C_1$-$C_{30}$ alkyl groups include, notably, methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pentyl, 2-methyl-2-hexyl, octyl, 4-methyl-3-heptyl, nonyl, decyl, undecyl and dodecyl groups.

The positively charged cation of the ionic liquid is preferably selected from the group consisting of:
a pyrrolidinium cation of formula (II):

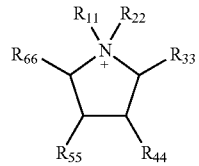

(II)

wherein $R_{11}$ and $R_{22}$, equal to or different from each other, independently represent a $C_1$-$C_8$ alkyl group and $R_{33}$, $R_{44}$, $R_{55}$ and $R_{66}$, equal to or different from each other, independently represent a hydrogen atom or a $C_1$-$C_{30}$ alkyl group, preferably a $C_1$-$C_{18}$ alkyl group, more preferably a $C_1$-$C_8$ alkyl group, and a piperidinium cation of formula (III):

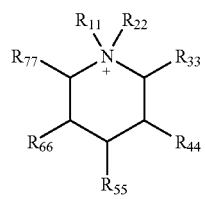

(III)

wherein $R_{11}$ and $R_{22}$, equal to or different from each other, independently represent a $C_1$-$C_8$ alkyl group and $R_{33}$, $R_{44}$, $R_{55}$, $R_{66}$ and $R_{77}$, equal to or different from each other, independently represent a hydrogen atom or a $C_1$-$C_{30}$ alkyl group, preferably a $C_1$-$C_{18}$ alkyl group, more preferably a $C_1$-$C_8$ alkyl group.

The positively charged cation of the ionic liquid is more preferably selected from the group consisting of:
a pyrrolidinium cation of formula (II-A):

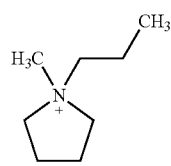

(II-A)

a piperidinium cation of formula (III-A):

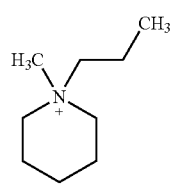

(III-A)

The negatively charged anion of the ionic liquid is preferably selected from the group consisting of:
bis(trifluoromethylsulphonyl)imide of formula $(SO_2CF_3)_2N^-$,
hexafluorophosphate of formula $PF_6^-$,
tetrafluoroborate of formula $BF_4^-$, and
oxaloborate of formula:

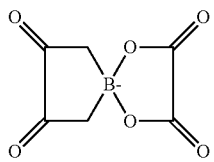 [SMILES: O=C1C[B-]2(CC1=O)OC(=O)C(=O)O2]

The ionic liquid even more preferably contains a pyrrolidinium cation of formula (II-A) as defined above and a perfluorinated anion selected from the group consisting of bis(trifluoromethylsulphonyl)imide of formula $(SO_2\ CF_3)_2N^-$, hexafluorophosphate of formula $PF_6^-$ and tetrafluoroborate of formula $BF_4^-$.

For the purpose of the present invention, the term "conductive compound [compound (C)]" is intended to denote a compound able to impart electron conductivity to the electrode.

The compound (C) is typically selected from the group consisting of carbonaceous materials such as carbon black, carbon nanotubes, graphite powder, graphite fiber and metal powders or fibers such as nickel and aluminium powders or fibers.

Under step (iv) of the process of the invention, drying may be performed either under atmospheric pressure or under vacuum. Alternatively, drying may be performed under modified atmosphere, e.g. under an inert gas, typically exempt notably from moisture (water vapour content of less than 0.001% v/v).

The drying temperature will be selected so as to effect removal by evaporation of one or more solvents (S) from the electrode (E) of the invention.

The electrode (E) of the invention is preferably free from one or more solvents (S).

The layer (L1) of the electrode (E) of the invention typically has a thickness comprised between 10 μm and 500 μm, preferably between 50 μm and 250 μm, more preferably between 70 μm and 150 μm.

In a fourth instance, the present invention pertains to an electrochemical device comprising the electrode (E) of the invention.

In particular, the present invention further pertains to a secondary battery comprising:
a positive electrode,
a negative electrode, and
between said positive electrode and said negative electrode, a membrane,
wherein at least one of the positive electrode and the negative electrode is the electrode (E) of the invention.

The present invention thus also pertains to a process for the manufacture of a secondary battery, said process comprising assembling a membrane between a positive electrode and a negative electrode, wherein at least one of the positive electrode and the negative electrode is the electrode (E) of the invention.

For the purpose of the present invention, the term "membrane" is intended to denote a discrete, generally thin, interface which moderates permeation of chemical species in contact with it. This interface may be homogeneous, that is, completely uniform in structure (dense membrane), or it may be chemically or physically heterogeneous, for example containing voids, pores or holes of finite dimensions (porous membrane).

The membrane typically comprises at least one material selected from inorganic materials and organic materials.

Non-limiting examples of suitable organic materials include, notably, polymers, said polymers being preferably selected from the group consisting of partially fluorinated fluoropolymers.

The membrane is advantageously free from one or more compounds (EA) as defined above.

The membrane may further comprise at least one medium (L) as defined above and at least one salt (M) as defined above.

According to a first embodiment of the invention, the membrane comprises a fluoropolymer hybrid organic/inorganic composite, said hybrid being obtainable by a process comprising hydrolysing and/or condensing a composition comprising:
at least one partially fluorinated fluoropolymer,
at least one metal compound [compound (M1)] of formula (IV):

wherein m is an integer from 1 to 4, A is a metal selected from the group consisting of Si, Ti and Zr, Y is a hydrolysable group and X is a hydrocarbon group, optionally comprising one or more functional groups,
at least one ionic liquid as defined above, and
at least one metal salt [salt (M)] as defined above.

The selection of the hydrolysable group Y of the compound (M1) of formula (IV) as defined above is not particularly limited provided that it enables under appropriate conditions the formation of a —O—A≡ bond. The hydrolysable group Y of the compound (M1) of formula (IV) as defined above is typically selected from the group consisting of halogen atoms, preferably being a chlorine atom, hydrocarboxy groups, acyloxy groups and hydroxyl groups.

In case the compound (M1) of formula (IV) as defined above comprises at least one functional group on group X, it will be designated as functional compound (M1); in case none of groups X of the compound (M1) of formula (IV) as defined above comprise a functional group, the compound (M1) of formula (IV) as defined above will be designated as non-functional compound (M1).

The compound (M1) is preferably of formula (IV-A):

wherein m is an integer from 1 to 4, and, according to certain embodiments, from 1 to 3, A is a metal selected from the group consisting of Si, Ti and Zr, $R^A$ and $R^B$, equal to or different from each other and at each occurrence, are independently selected from $C_1$-$C_{18}$ hydrocarbon groups, wherein $R^A$ optionally comprises at least one functional group.

Non-limiting examples of functional groups include, notably, epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

Should the compound (M1) of formula (IV) as defined above be a functional compound (M1), it is more preferably of formula (IV-B):

 (IV-B)

wherein m is an integer from 1 to 3, A is a metal selected from the group consisting of Si, Ti and Zr, $R^{A'}$, equal to or different from each other and at each occurrence, is a $C_1$-$C_{12}$ hydrocarbon group comprising at least one functional group and $R^{B'}$, equal to or different from each other and at each occurrence, is a $C_1$-$C_5$ linear or branched alkyl group, preferably $R^{B'}$ being a methyl or ethyl group.

Examples of functional compounds (M1) are notably vinyltriethoxysilane, vinyltrimethoxysilane, vinyltrismethoxyethoxysilane of formula $CH_2=CHSi(OC_2H_4OCH_3)_3$, 2-(3,4-epoxycyclohexylethyltrimethoxysilane) of formula:

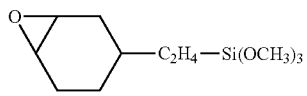

glycidoxypropylmethyldiethoxysilane of formula:

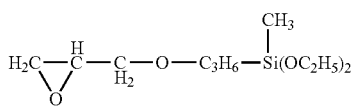

glycidoxypropyltrimethoxysilane of formula:

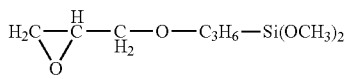

methacryloxypropyltrimethoxysilane of formula:

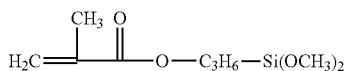

aminoethylaminpropylmethyldimethoxysilane of formula:

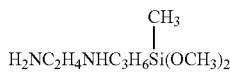

aminoethylaminpropyltrimethoxysilane of formula:

$H_2NC_2H_4NHC_3H_6Si(OCH_3)_3$, 3-aminopropyltriethoxysilane, 3-phenylaminopropyltrimethoxysilane,
3-chloroisobutyltriethoxysilane, 3-chloropropyltrimethoxysilane,
3-mercaptopropyltriethoxysilane, 3-mercaptopropyltrimethoxysilane,
n-(3-acryloxy-2-hydroxypropyl)-3-aminopropyltriethoxysilane,
(3-acryloxypropyl)dimethylmethoxysilane,
(3-acryloxypropyl)methyldichlorosilane,
(3-acryloxypropyl)methyldimethoxysilane,
3-(n-allylamino)propyltrimethoxysilane,
2-(4-chlorosulfonylphenyl)ethyltrimethoxysilane,
2-(4-chlorosulphonylphenyl)ethyl trichlorosilane, carboxyethylsilanetriol,
and its sodium salts, triethoxysilylpropylmaleamic acid of formula:

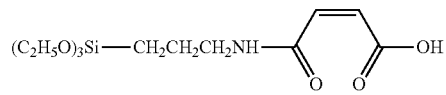

3-(trihydroxysilyl)-1-propane-sulphonic acid of formula $HOSO_2-CH_2CH_2CH_2-Si(OH)_3$, N-(trimethoxysilylpropyl)ethylene-diamine triacetic acid, and its sodium salts, 3-(triethoxysilyl)propylsuccinic anhydride of formula:

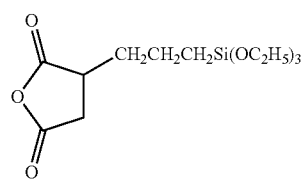

acetamidopropyltrimethoxysilane of formula $H_3C-C(O)NH-CH_2CH_2CH_2-Si(OCH_3)_3$, alkanolamine titanates of formula $Ti(L)_x(OR)_y$, wherein L is an amine-substituted alkoxy group, e.g. $OCH_2CH_2NH_2$, R is an alkyl group, and x and y are integers such that x+y=4.

Examples of non-functional compounds (M1) are notably trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

According to a second embodiment of the invention, the membrane comprises a fluoropolymer hybrid organic/inorganic composite, at least one liquid medium [medium (L)] as defined above and at least one metal salt [salt (M)] as defined above, said hybrid being obtainable by a process comprising hydrolysing and/or condensing a composition comprising:

at least one partially fluorinated fluoropolymer comprising recurring units derived from at least one functional hydrogenated monomer comprising at least one hydroxyl end group, at least one metal compound [compound (M2)] of formula (V):

 (V)

wherein m' is an integer from 1 to 3, A' is a metal selected from the group consisting of Si, Ti and Zr, Y' is a hydrolysable group and X' is a hydrocarbon group comprising at least one $-N=C=O$ functional group, optionally, at least one metal compound [compound (M1)] of formula (IV) as defined above, at least one liquid medium [medium (L)] as defined above, and at least one metal salt [salt (M)] as defined above.

The selection of the hydrolysable group Y' of the compound (M2) of formula (V) as defined above is not particularly limited provided that it enables under appropriate conditions the formation of a —O-A≡ bond. The hydrolysable group Y' of the compound (M2) of formula (V) as defined above is typically selected from the group consisting of halogen atoms, preferably being a chlorine atom, hydrocarboxy groups, acyloxy groups and hydroxyl groups.

The compound (M2) is preferably of formula (V-A):

$R^C_{4-m'}A'(OR^D)_{m'}$ (V-A)

wherein m' is an integer from 1 to 3, A' is a metal selected from the group consisting of Si, Ti and Zr, $R^C$, equal to or different from each other and at each occurrence, is a $C_1$-$C_{12}$ hydrocarbon group comprising at least one —N=C=O functional group and $R^D$, equal to or different from each other and at each occurrence, is a $C_1$-$C_5$ linear or branched alkyl group, preferably $R^D$ being a methyl or ethyl group.

The compound (M2) is more preferably of formula (V-B):

$O=C=N—R^{C'}-A'-(OR^{D'})_3$ (V-B)

wherein A' is a metal selected from the group consisting of Si, Ti and Zr, $R^{C'}$, equal to or different from each other and at each occurrence, is a linear or branched $C_1$-$C_{12}$ hydrocarbon group and $R^{D'}$, equal to or different from each other and at each occurrence, is a $C_1$-$C_5$ linear or branched alkyl group, preferably $R^{D'}$ being a methyl or ethyl group.

Non-limiting examples of suitable compounds (M2) include the followings: trimethoxysilyl methyl isocyanate, triethoxysilyl methyl isocyanate, trimethoxysilyl ethyl isocyanate, triethoxysilyl ethyl isocyanate, trimethoxysilyl propyl isocyanate, triethoxysilyl propyl isocyanate, trimethoxysilyl butyl isocyanate, triethoxysilyl butyl isocyanate, trimethoxysilyl pentyl isocyanate, triethoxysilyl pentyl isocyanate, trimethoxysilyl hexyl isocyanate and triethoxysilyl hexyl isocyanate.

Should the compound (M1) of formula (IV) as defined above in the membrane according to this second embodiment of the invention be a functional compound (M1), it typically comprises at least one functional group different from the —N=C=O functional group.

According to a first embodiment of the invention, the secondary battery comprises:

a positive electrode [electrode (Ep)], a negative electrode, and between said electrode (Ep) and said negative electrode, a membrane as defined above.

The negative electrode of the secondary battery of this first embodiment of the invention is typically a metal substrate, preferably a foil made from a metal such as lithium or zinc.

According to a second embodiment of the invention, the secondary battery comprises:

a positive electrode [electrode (Ep)], a negative electrode [electrode (En)], and between said electrode (Ep) and said electrode (En), a membrane as defined above.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Polymer (FF-A): VDF-AA (0.9% by moles)-HFP (2.4% by moles) polymer having a viscosity of 0.30 l/g in DMF at 25° C.

Polymer (FF-B): VDF-AA (0.9% by moles) polymer having a viscosity of 0.30 l/g in DMF at 25° C.

Polymer (F-1): VDF-HEA (0.8% by moles)-HFP (2.4% by moles) polymer having a Melt Flow Index (MFI) of 15 g/min (2.16 Kg, 230° C.).

Polymer (F-2): VDF-HEA (0.8% by moles) polymer having a Melt Flow Index (MFI) of 15 g/min (2.16 Kg, 230° C.).

Polymer (F-3): VDF-HFP copolymer having a melting point of about 148.5-149° C. and a viscosity of 0.28-0.29 l/g in DMF at 25° C.

LiTFSI: bis(trifluoromethanesulfonyl)imide lithium salt.

Pyr13TFSI: N-propyl-N-methylpyrrolidinium bis(trifluoromethanesulfonyl)imide.

Electrolyte medium (EL-1): solution of LiTFSI (0.5 mol/L) in Pyr13TFSI.

Electrolyte medium (EL-2): solution of LiTFSI (1 mol/L) in ethylene carbonate (EC)/propylene carbonate (PC) (1/1 by volume) comprising vinylene carbonate (VC) (2% by weight).

Graphite: 75% SMG HE2-20 (Hitachi Chemical Co., Ltd.)/25% TIMREX® SFG 6.

DBTDL: dibutyl tin dilaurate

TSPI: 3-(triethoxysilyl)propyl isocyanate

Adhesion Tests of the Electrodes

The interlayer adhesion strength between the metal collector and the layer (L1) of the electrode was measured according to the following procedure: a stripe of SCOTCH® 3M467M adhesive was firmly stuck on a stainless steel plaque and the other side of the stripe was stuck to the electrode. The adhesion strength of this stripe to the electrode was enhanced by pressing 3 times with a stainless steel roll on it. The standard delamination was measured at 180° and the force was measured in N/m. The drawing speed was 300 mm/min at room temperature.

General Procedure for the Preparation of Electrodes Using the Electrolyte Medium (EL-1)

A solution of polymer (FF-B) in DMSO was prepared at 60° C. and then brought to room temperature.

In the next step, the electrolyte medium (EL1) was added to the solution The weight ratio $[m_{electrolyte}/(m_{electrolyte}+m_{polymer\ (FF-)})] \times 100$ was 70%.

Cathode: A composition comprising a blend of SUPER P® carbon black (CF) and LiFePO$_4$ (LFP) was added to the solution so obtained in a weight ratio 87/13 ((CF+LFP)/polymer (FF-B)). The CF/LFP weight ratio was 13/87.

Casting Procedure

The solution mixture was spread with a constant thickness onto a metal collector using a tape casting machine (doctor blade). The thickness was controlled by the distance between the knife and the metal collector. The thickness of the wet layer (L1) of the electrode so obtained was about 250 μm.

The electrode was then dried during one hour under vacuum and subsequently calendered using a static press at room temperature under a pressure of 5 kN/cm². The final loading was 0.5 mAh/cm².

General Procedure for the Preparation of Membranes Using the Electrolyte Medium (EL-1)

A membrane was prepared as described in Example 3 of WO 2013/160240 (SOLVAY SPECIALTY POLYMERS ITALY S.P.A.) Oct. 31, 2013.

General Procedure for the Preparation of Electrodes Using the Electrolyte Medium (EL-2)

A solution of polymer (FF-A) in acetone was prepared at 60° C. and then brought to room temperature.

In the next step, the electrolyte medium (EL2) was added to the solution.

The weight ratio $[m_{electrolyte}/(m_{electrolyte}+m_{polymer\ (FF-A)})] \times 100$ was 75%.

Anode: Graphite was added to the solution so obtained in a weight ratio of 90/10 (graphite/polymer (FF-A)).

Cathode: A composition comprising a blend of 50% by weight of C-NERGY® SUPER $C_{65}$ carbon black and 50% by weight of VGCF® carbon fiber (CF) and $LiFePO_4$ (LFP) was added to the solution so obtained in a weight ratio of 90/10 ((CF+LFP)/polymer (FF-A)). The CF/LFP weight ratio was 11/89.

Casting Procedure

The solution mixture was spread with a constant thickness onto a metal collector using a tape casting machine (doctor blade). The thickness was controlled by the distance between the knife and the metal collector. The thickness of the wet layer (L1) of the anode so obtained was about 120 μm. The thickness of the wet layer (L1) of the cathode so obtained was about 250 μm.

The viscosity of the mixture was tuned by adding acetone. The solvent was then evaporated from said mixture thereby providing the electrode.

General Procedure for the Preparation of Membranes Using the Electrolyte Medium (EL-2)

The polymer (F-1) (1.5 g) was dissolved in 8.5 g of acetone at 60° C. thereby providing a solution containing 15% by weight of said polymer (F-1). The solution was homogeneous and transparent after homogenization at room temperature. DBTDL (0.015 g) was then added.

The solution was homogenized at 60° C. and then brought to room temperature. TSPI (0.060 g) was added thereto. The quantity of DBTDL was calculated to be 10% by moles vs. TSPI. TSPI itself was calculated to be 1.1% by moles vs. the polymer 1. Once again, the solution was homogenized at 60° C. and then it was left at 60° C. for about 90 min so as to let isocyanate functional groups of TSPI to react with the hydroxyl groups of the polymer 1. The solution was then brought to room temperature.

In the next step, the electrolyte medium (EL-2) was added.

The weight ratio $[m_{electrolyte}/(m_{electrolyte}+m_{polymer\ (F-1)})]$ was 66%.

After homogenization at 60° C., formic acid was added. The solution was homogenized at 60° C. and then brought to room temperature. TEOS was added thereto.

The quantity of TEOS was calculated from the weight ratio $(m_{SiO2}/m_{polymer1})$ assuming total conversion of TEOS into $SiO_2$. This ratio was 10%.

The quantity of formic acid was calculated from the following equation:

$$n_{formic\ acid}/n_{TEOS}=7.8.$$

The solution mixture was spread with a constant thickness onto PET substrate using a tape casting machine (doctor blade). The thickness was controlled by the distance between the knife and the PET film.

The solvent was quickly evaporated from the solution mixture and the membrane was obtained. After a few hours, the membrane was detached from the PET substrate. The membrane so obtained had a constant thickness of 20 μm.

EXAMPLE 1—ANODE (EL-2)

The anode was prepared by casting a layer from the solution mixture prepared according to the general procedure for the preparation of electrodes using the electrolyte medium (EL-2) as detailed above onto a copper collector.

Adhesion strength: a force of 50 N/m was measured between the anode layer so obtained and the copper collector.

EXAMPLE 2—CATHODE (EL-2)

The cathode was prepared by casting a layer from the solution mixture prepared according to the general procedure for the preparation of electrodes using the electrolyte medium (EL-2) as detailed above onto an aluminium collector.

Adhesion strength: a force of 11 N/m was measured between the cathode layer so obtained and the metal collector.

COMPARATIVE EXAMPLE 1—A—ANODE

The anode was prepared by using the same procedure as detailed in Example 1 but using the polymer (F-3) in place of the polymer (FF-A). No interlayer adhesion was observed between the anode layer so obtained and the metal collector.

COMPARATIVE EXAMPLE 2-A—CATHODE

The cathode was prepared by using the same procedure as detailed in Example 2 but using the polymer (F-1) in place of the polymer (FF-A). No interlayer adhesion was observed between the anode layer so obtained and the metal collector.

EXAMPLE 3—CATHODE (EL-1)

The cathode was prepared by casting a layer from the solution mixture prepared according to the general procedure for the preparation of electrodes using the electrolyte medium (EL-1) as detailed above onto an aluminium collector.

Adhesion strength: a force of 136 N/m was measured between the cathode layer so obtained and the metal collector.

COMPARATIVE EXAMPLE 3—CATHODE

The cathode was prepared by using the same procedure as detailed in Example 3 but using the polymer (F-2) the in place of the polymer (FF-B). No interlayer adhesion was observed between the layer . . . and the metal collector.

COMPARATIVE EXAMPLE 4-A—CATHODE

A 12% by weight solution of the polymer (FF-B) in N-methyl-2-pyrrolidone was prepared at 60° C. and then brought to room temperature. A composition comprising a blend of 50% by weight of C-NERGY® SUPER C65 carbon black and 50% by weight of VGCF® carbon fiber (CF) and $LiFePO_4$ (LFP) was added to the solution so obtained in a weight ratio of 95.5/4.5 ((CF+LFP)/polymer (FF-B)). The CF/LFP weight ratio was 4/96. The solution mixture was spread with a constant thickness onto a metal collector using a tape casting machine (doctor blade). The thickness was controlled by the distance between the knife and the metal collector. The thickness of the wet layer of the cathode so obtained was about 15 μm. The solvent was then evaporated from said mixture by drying at 60° C. during one night thereby providing the electrode.

COMPARATIVE EXAMPLE 4-B—ANODE

A 12% by weight solution of the polymer (FF-B) in N-methyl-2-pyrrolidone was prepared at 60° C. and then brought to room temperature. Graphite was added to the solution so obtained in a weight ratio of 96/4 (graphite/polymer (FF-B)).

The solution mixture was spread with a constant thickness onto a metal collector using a tape casting machine (doctor blade). The thickness was controlled by the distance between the knife and the metal collector. The thickness of the wet layer of the anode so obtained was about 15 μm. The solvent was then evaporated from said mixture by drying at 60° C. during one night thereby providing the electrode.

EXAMPLE 4—MANUFACTURE OF A LITHIUM-ION BATTERY

A coin cell was prepared by placing the membrane prepared according to the general procedure as detailed above using the electrolyte medium (EL-2) between the cathode (EL-2) of Example 2 and the anode (EL-2) of Example 1.

The discharge capacity values of the coin cell so obtained under different discharge rates are set forth in Table 1 here below.

TABLE 1

| Rate | | Average Discharge Capacity [mAh/g] | [%] |
|---|---|---|---|
| 0.05 | Discharge D/20 | 85 | 100 |
| 0.1 | Discharge D/10 | 78 | 92 |
| 0.2 | Discharge D/5 | 66 | 78 |
| 0.5 | Discharge D/2 | 35 | 41 |
| 1 | Discharge D | 19 | 22 |
| 2 | Discharge 2D | 8 | 9 |
| 0.05 | Discharge D/20 | 70 | 82 |

COMPARATIVE EXAMPLE 5

A coin cell was prepared by placing the membrane prepared according to the general procedure as detailed above using the electrolyte medium (EL-2) between the cathode prepared as detailed in Comparative Example 4-A and the anode prepared as detailed in Comparative Example 4-B. The battery thereby provided did not work.

EXAMPLE 5—MANUFACTURE OF A LITHIUM-ION BATTERY

A Swagelok cell was prepared by placing the membrane prepared according to the general procedure as detailed above using the electrolyte medium (EL-1) between a lithium metal foil and the cathode (EL-1) of Example 3.

The discharge capacity values of the cell so obtained at 60° C. under different discharge rates are set forth in Table 2 here below.

TABLE 2

| Rate | | Average Discharge Capacity [mAh/g] | [%] |
|---|---|---|---|
| 0.05 | Discharge D/20 | 160 | 100 |
| 0.1 | Discharge D/10 | 150 | 94 |
| 0.2 | Discharge D/5 | 140 | 88 |
| 0.5 | Discharge D/2 | 130 | 81 |
| 1 | Discharge D | 110 | 79 |
| 2 | Discharge 2D | 65 | 41 |
| 5 | Discharge 5D | 10 | 6 |

COMPARATIVE EXAMPLE 6

A Swagelok cell was prepared by placing the membrane prepared according to the general procedure as detailed above using the electrolyte medium (EL-1) between a lithium metal foil and a cathode prepared from a solution in N-methyl-2-pyrrolidone comprising 8% by weight of the polymer (F-2), 82% by weight of $LiFePO_4$ (LFP) and 10% by weight of VGCF® carbon fiber (CF).

The battery thereby provided did not work after 5 cycles at a rate of C/20.

The invention claimed is:

1. An electrochemical device being a secondary battery comprising:
    a positive electrode,
    a negative electrode, and
    between said positive electrode and said negative electrode, a membrane, wherein:
    A) at least one of said positive electrode and said negative electrode is an electrode obtainable by a process, said process comprising:
        (i) providing a metal substrate;
        (ii) providing an electrode-forming composition (C1) comprising:
            at least one polymer (FF), wherein polymer (FF) is a partially fluorinated fluoropolymer comprising linear sequences of recurring units derived from at least one fluorinated monomer and at least one functional hydrogenated monomer comprising at least one carboxylic acid end group,
            at least one electro-active compound (EA),
            at least one liquid medium (L) comprising at least one organic carbonate or at least one ionic liquid, and
            at least one metal salt (M);
        (iii) applying the composition provided in step (ii) onto the metal substrate provided in step (i) thereby providing an assembly comprising a metal substrate coated with at least one layer consisting of said composition (C1); and
        (iv) drying the assembly provided in step (iii);
    wherein said electrode comprises:
        the metal substrate, and
        directly adhered onto said metal substrate, at least one layer (L1) consisting of a composition (C2) comprising:
            at least one partially fluorinated fluoropolymer (FF) comprising linear sequences of recurring units derived from at least one fluorinated monomer and at least one functional hydrogenated monomer comprising at least one carboxylic acid end group,
at least one electroactive compound (EA),
at least one liquid medium (L) comprising at least one organic carbonate or at least one ionic liquid, and
at least one metal salt (M), B) the membrane comprises a fluoropolymer hybrid organic/inorganic composite, said fluoropolymer hybrid organic/inorganic composite being obtained by a process comprising hydrolysing and/or condensing a composition comprising:
at least one partially fluorinated fluoropolymer,
at least one metal compound (M1) of formula (IV):

$$X_{4-m}AY_m \quad (IV)$$

wherein m is an integer from 1 to 4, A is a metal selected from the group consisting of Si, Ti and Zr, Y is a hydrolysable group and X is a hydrocarbon group, optionally comprising one or more functional groups,
at least one ionic liquid, and
at least one metal salt (M).

2. The electrochemical device according to claim 1, wherein in composition (C1) the polymer (FF) is a polymer (FF-I) comprising recurring units derived from vinylidene fluoride (VDF), at least one functional hydrogenated monomer comprising at least one carboxylic acid end group and, optionally, at least one fluorinated monomer different from VDF.

3. The electrochemical device according to claim 1, wherein in composition (C1) the functional hydrogenated monomer comprising at least one carboxylic acid end group is selected from the group consisting of (meth)acrylic monomers of formula (I):

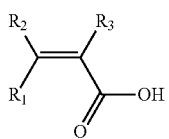

(I)

wherein each of $R_1$, $R_2$ and $R_3$, equal to or different from each other, is independently a hydrogen atom or a $C_1$-$C_3$ hydrocarbon group.

4. The electrochemical device according to claim 1, wherein in composition (C1) the polymer (FF) comprises at least 0.01% by moles, of recurring units derived from at least one functional hydrogenated monomer comprising at least one carboxylic acid end group.

5. The electrochemical device according to claim 1, wherein the composition (C1) comprises at least 40% by weight of medium (L), based on the total weight of said medium (L) and polymer (FF).

6. The electrochemical device according to claim 1, wherein the concentration of salt (M) in medium (L) is at least 0.01 M.

7. The electrochemical device according to claim 1, wherein the concentration of salt (M) in medium (L) is at most 3M.

8. The electrochemical device according to claim 1, wherein the salt (M) is selected from the group consisting of:
(a) MeI, Me(PF$_6$)$_n$, Me(BF$_4$)$_n$, Me(ClO$_4$)$_n$, Me(bis(oxalato)borate)$_n$ ("Me(BOB)$_n$"), MeCF$_3$SO$_3$, Me[N(CF$_3$SO$_2$)$_2$]$_n$, Me[N(C$_2$F$_5$SO$_2$)$_2$]$_n$, Me[N(CF$_3$SO$_2$)(R$_F$SO$_2$)]$_n$, wherein R$_F$ is C$_2$F$_5$, C$_4$F$_9$ or CF$_3$OCF$_2$CF$_2$, Me(AsF$_6$)$_n$, Me[C(CF$_3$SO$_2$)$_3$]$_n$, Me$_2$Sn, wherein Me is a metal, and n is the valence of said metal, (b)

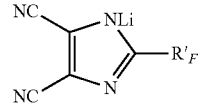

wherein R'$_F$ is selected from the group consisting of F, CF$_3$, CHF$_2$, CH$_2$F, C$_2$F$_4$, C$_2$H$_2$F$_3$, C$_2$H$_3$F$_2$, C$_2$F$_5$, C$_3$F$_7$, C$_3$H$_2$F$_5$, C$_3$H$_4$F$_3$, C$_4$F$_9$, C$_4$H$_2$F$_7$, C$_4$H$_4$F$_5$, C$_5$F$_{11}$, C$_3$F$_5$OCF$_3$, C$_2$F$_4$OCF$_3$, C$_2$H$_2$F$_2$OCF$_3$ and CF$_2$OCF$_3$, and (c) combinations thereof.

9. The electrochemical device according to claim 1, wherein composition (C1) is applied onto the metal substrate by at least one method selected from casting, printing and roll coating.

10. The electrochemical device according to claim 1, wherein the membrane comprises a fluoropolymer hybrid organic/inorganic composite, at least one liquid medium (L) and at least one metal salt (M) said fluoropolymer hybrid organic/inorganic composite being obtained by a process comprising hydrolysing and/or condensing a composition comprising:
at least one partially fluorinated fluoropolymer comprising recurring units derived from at least one functional hydrogenated monomer comprising at least one hydroxyl endgroup,
at least one metal compound (M2) of formula (V):

$$X'_{4-m'}A'Y'_{m'} \quad (V)$$

wherein m' is an integer from 1 to 3, A' is a metal selected from the group consisting of Si, Ti and Zr, Y' is a hydrolysable group and X' is a hydrocarbon group comprising at least one —N=C=O functional group,
optionally, at least one metal compound (M1) of formula (IV):

$$X_{4-m}AY_m \quad (IV)$$

wherein m is an integer from 1 to 4, A is a metal selected from the group consisting of Si, Ti and Zr, Y is a hydrolysable group and X is a hydrocarbon group, optionally comprising one or more functional groups,
at least one liquid medium (L), and
at least one metal salt (M).

11. The electrochemical device according to claim 4, wherein in composition C1 the polymer (FF) comprises at least 0.05% by moles of recurring units derived from at least one functional hydrogenated monomer comprising at least one carboxylic acid end group.

12. The electrochemical device according to claim 11, wherein in composition C1 the polymer (FF) comprises at least 0.1% by moles of recurring units derived from at least one functional hydrogenated monomer comprising at least one carboxylic acid end group.

13. The electrochemical device according to claim 6, wherein the concentration of salt (M) in medium (L) is at least 0.025 M.

14. The electrochemical device according to claim 7, wherein the concentration of salt (M) in medium (L) is at most 2 M.

15. The electrochemical device according to claim 14, wherein the concentration of salt (M) in medium (L) is at least at least 0.05 M and at most 1 M.

\* \* \* \* \*